G. L. JACQUES.
FRICTION TRANSMISSION.
APPLICATION FILED NOV. 20, 1918.

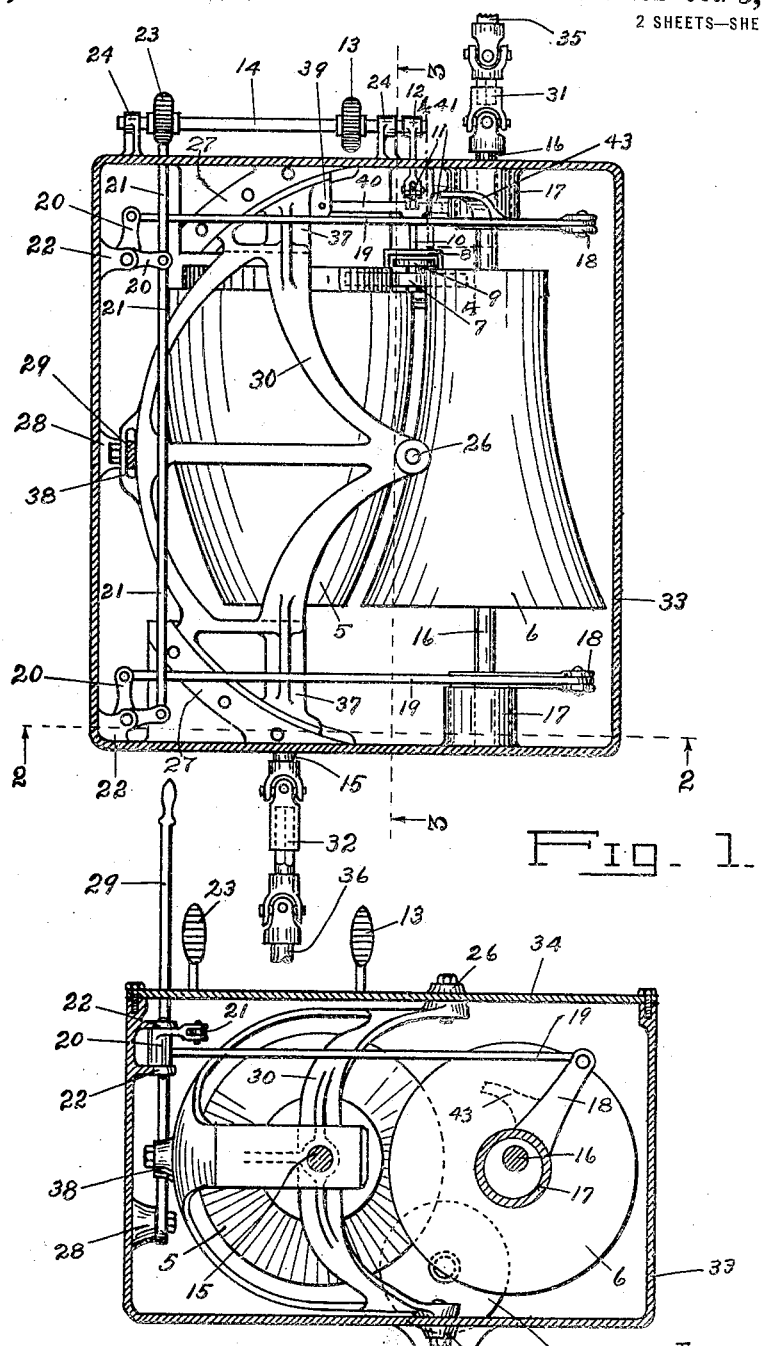

1,354,486.

Patented Oct. 5, 1920.
2 SHEETS—SHEET 2.

Inventor.
George L. Jacques,

By

ATTORNEYS.

UNITED STATES PATENT OFFICE.

GEORGE L. JACQUES, OF NEILLSVILLE, WISCONSIN.

FRICTION TRANSMISSION.

1,354,486.     Specification of Letters Patent.     Patented Oct. 5, 1920.

Application filed November 20, 1918. Serial No. 263,320.

*To all whom it may concern:*

Be it known that I, GEORGE L. JACQUES, a citizen of the United States, and a resident of Neillsville, in the county of Clark and State of Wisconsin, have made certain new and useful Improvements in Friction Transmissions, of which the following its a specification.

This invention relates to transmissions and more especially to friction transmissions and the particular object is to provide a device of this character with means to propel any vehicle and to provide a novel transmission or friction mechanism from the motor to the drive wheels of the automobile, truck, tractor or the like.

A still further object is to provide a novel means for reversing the drive of the propelling means or friction transmission mechanism.

Another object is to provide a novel construction for supporting the friction cones and altering the speed at will without the use of a clutch.

With these and other objects in view, the invention consists in certain new inventions, combinations and arrangements of parts to be hereinafter more fully described and claimed, it being understood that minor changes may be made in the specific structure set forth and shown as may be included within the scope of the claims.

In the drawings forming part of this specification and in which like numerals designate similar parts throughout the several views, Figure 1 is a horizontal section through the transmission case, showing most of the operating parts in top plan view.

Fig. 2 is a vertical cross section taken through one end of the transmission case, substantially on line 2—2 of Fig. 1.

Figure 3:
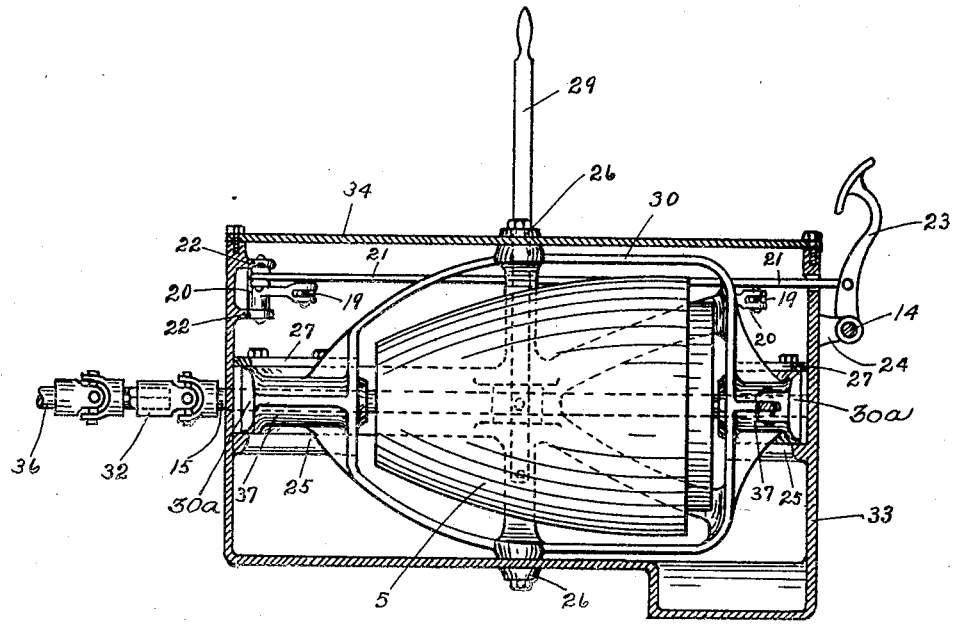
Fig. 3 is a vertical longitudinal section taken therethrough substantially on line 3—3 of Fig. 1.
Figure 4:
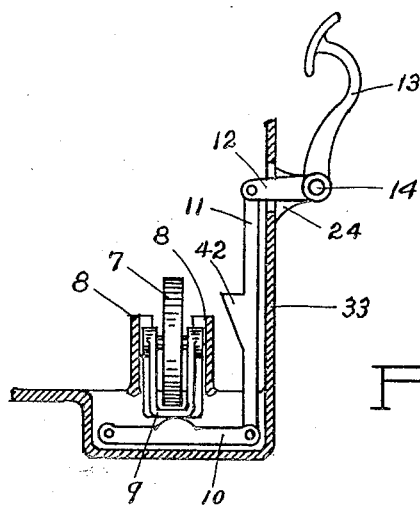
Fig. 4 is a detail partially vertical section taken substantially as on line 4—4 of Fig. 1.

Referring now to these figures, the driven cone 5 is rigidly mounted upon a shaft 15 journaled through the portions 37 of a pivot cage 30, and journaled at one end through one end of the transmission case 33, the last mentioned end of the shaft 15 being connected to the driving shaft 36 of the vehicle by universal joints and a sliding sleeve 32 as particularly seen in Fig. 1.

The pivot cage 30, which carries the driven cone 5, is provided at its forward and rear ends with bearing shoes 30$^a$, each of which is part of a circle concentric with the pivots 26 connecting portions of the cage with the bottom of the transmission case 33 and with its cover 34. These shoes 30$^a$ work between bearing ribs 25 upon the front and rear walls of the transmission case, and cap plates 27, the shoes resting upon the ribs 25 with the cap plates disposed thereabove and bolted in place to insure against displacement.

The driving cone 6 is rigidly mounted on the shaft 16 which is coupled to the motor shaft 35 by the universal joints and sliding sleeve 31, said shaft 16 being loosely journaled through the eccentrics 18 which are carried in the eccentric boxes 17 at both ends of the driving cone 6, said eccentric boxes being fastened to the transmission case 33.

The driving cone 6 may be constructed with straight sides from end to end instead of concave as shown in the drawings, where the sides of the driving cone 6 are curved in or concave while that of the driven cone 5 are convex. The driven cone being of a smaller curve or radius than that of the driving cone 6 thus permits the driven cone 5 to be rocked against the driving cone 6 without any end slippage or sliding motion, and thus enables the speed of the driven cone 5 to be altered without disengaging the two cones.

The driving cone 6 is brought into contact with the driven cone 5 by the eccentrics 18, said eccentrics 18 being pivoted to the connecting rods 19 which are in turn pivoted to the bell cranks 20, said bell cranks being carried by the brackets 22 and are also pivoted to the coupling rod 21 extending forward and through the transmission case 33 and is then pivoted to the foot pedal 23, said foot pedal 23 being loosely mounted on the shaft 14 carried by the extending brackets 24. The foot pedal may be provided with any suitable appliance to hold it locked in position when pressed forward to bring the two cones in contact.

The foot pedal 13 is rigidly mounted on the shaft 14 for raising and lowering the reversing friction wheel 7 which is journaled in the supporting clevis 9 which is positioned between the guides 8 extending upward from the bottom of the transmission case 33, said clevis 9 being carried on the lifting arm 10 which is pivoted to the connecting link 11 extending upward to the arm 12 which is rigidly mounted on the shaft 14.

The driven cone 5 is rocked upon the driving cone 6 by the hand lever 29 which is pivoted at its extreme lower end to the projecting boss 28 of the transmission case 33, said lever extending upward through a portion of the pivot cage 30 in the nature of a keeper 38.

The lock bar 40 is pivoted to the forward end of the pivot cage 30 and extends across to the guide block 41 wherein said lock bar 40 is slidably fitted, said guide block 41 being a part of and carried by the eccentric box 17, said lock bar 40 having a notch cut into its forward edge which will allow the guard 42 of the connecting link 11 to pass through when raising the reversing friction wheel 7 to engage one end of cone 6 and a reduced cylindrical end portion of cone 5 when, and only when, the cage 30 is in central position as seen in Fig. 1. The forward eccentric 18 is provided with a guard 43 so that when the reversing friction wheel is raised and in contact with the cones 5 and 6 the guard 43 will strike against the connecting link 11 and thereby prevent the two cones from being brought in contact when in a reverse motion.

In operation, when the lever 29 is pushed forward the pivot cage 30 carrying the driven cone 5 is moved on the pivot 26 rocking the driven cone 5 on the driving cone 6 so as to bring the large end of cone 5 in contact with the small end of cone 6, this being the slow speed; to increase the speed of the driven cone 5 the lever 29 is pulled backward carrying the pivot cage 30 thereby causing said driven cone 5 to rock against the surface of the driving cone 6 until its small end is in contact with the large end of the driving cone 6 when it is then in its high speed. It will thus be seen that high and low speeds may be obtained without disengaging the cones 5 and 6.

To reverse, the lever 29 is set in a perpendicular position, and the foot pedal 13 is pressed forward thereby lifting the connecting link 11 raising the friction wheel 7 into contact with the cones 5 and 6 and when in this position the guard 43 striking the connecting link 11 will prevent the cone 6 from being brought in contact with driven cone 5 until the foot pedal 13 is released. It will also be seen that by the lock bar 40 and the guard 42 fitting into the notch of the lock bar 40 the position of the driven cone 5 cannot be changed when the device is in a reverse motion.

The lever 29 may be provided with any suitable appliance of any make to hold said lever in a locked position when at rest.

What I claim is:

1. A friction transmission comprising a housing, eccentric boxes mounted at forward and rear ends of said housing, eccentrics therein, a shaft journaled through said eccentrics, a friction driving cone rigidly mounted on said shaft, a driving shaft to which the first shaft is universally and movably coupled, bearings at the forward and rear ends of said housing, a pivot cage having shoes at its forward and rear ends carried by said bearings, the pivot cage provided with bearings at its forward and rear ends, a shaft journaled through said bearings, a friction driven cone rigidly mounted on said last shaft and carried by the said pivot cage, a section of said driven cone at its forward end being of a smaller diameter than the driving cone and having a straight face, said pivot cage being pivoted to the cover and bottom of the housing, a hand lever pivoted to the housing and said pivot cage for engaging forward or rear ends of said cones, and a foot pedal coupled to said eccentrics to move the driving cone toward and away from the driven cone.

2. A device of the class described comprising a suitable housing, a pair of relatively movable friction cones arranged to engage and disengage and disposed parallel to one another in the neutral position, a friction wheel mounted below the friction cones, a supporting clevis for said friction wheel, means for raising said friction wheel to engage said friction cones, and means to prevent the raising of the friction wheel except when the cones are in neutral position.

3. A device of the class described comprising a housing, driving and driven cones therein, a pivot cage within the housing and supporting the driven cone, a friction wheel disposed below and movable vertically with respect to the said driving and driven cones and into and out of engagement with the latter, a pedal actuated lifting arm for shifting the said friction wheel, a lock bar carried by and projecting from the pivot cage and disposed in the path of movement of the said lifting arm, said lock bar having a notch therein, means for shifting one of the friction members into and out of engagement with the other, said lifting arm having a guard member movable vertically through the notch of the lock bar, and said cone shifting means also having a guard member in the path of movement of which the guard member of the lifting arm is shiftable to prevent the cones from being brought together when the friction wheel is lifted.

4. A friction transmission of the class described, comprising a housing, a motor actuated shaft therein, a driving cone mounted on the said shaft, a driven cone, a shaft within the housing on which the driven cone is mounted, a pivot cage movable in the housing and supporting the driven cone, a reversing friction wheel below the friction cones and movable vertically into and out of engagement therewith, means for shifting the driving cone into and out of engagement with the driven cone, means for moving the pivot cage and its friction cone to vary the point of contact between the same and the driving cone, means for shifting the friction wheel vertically, and means effective upon the elevation of the friction wheel, to lock the driving and driven cones in disengaged relation.

5. A friction transmission of the character described comprising a housing, driving and driven friction members disposed therein in approximately parallel relation, the surface of the driven member of which is curved, means for shifting the driving member into and out of engagement with the driven member, means for rocking the driven member while in contact with the driving member to vary the point of engagement therebetween, means for locking the driving member in disengaged relation, and reversing means, the moving into operative position of which renders said locking means effective.

6. A friction transmission of the character described comprising a housing, driving and driven friction members disposed therein in approximately parallel relation, the surface of the driven member being curved, means for shifting the driving member into and out of engagement with the driven member, means for rocking the driven member while in contact with the driving member to vary the point of engagement therebetween, and a reversing mechanism movable when the friction members are in neutral position and disengaged relation, and including a friction wheel shiftable into engagement with both of the friction members for the purpose described.

GEORGE L. JACQUES.